April 23, 1957　　　O. T. HOUGE　　　2,789,365
LEVELING INSTRUMENT
Filed Feb. 13, 1956
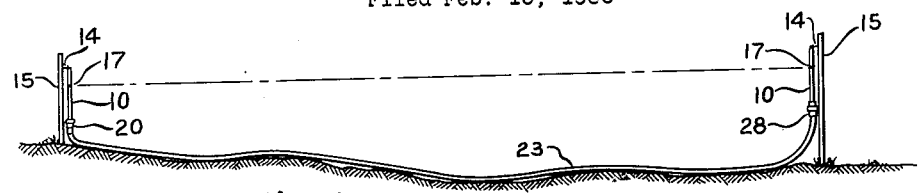
Fig. 1
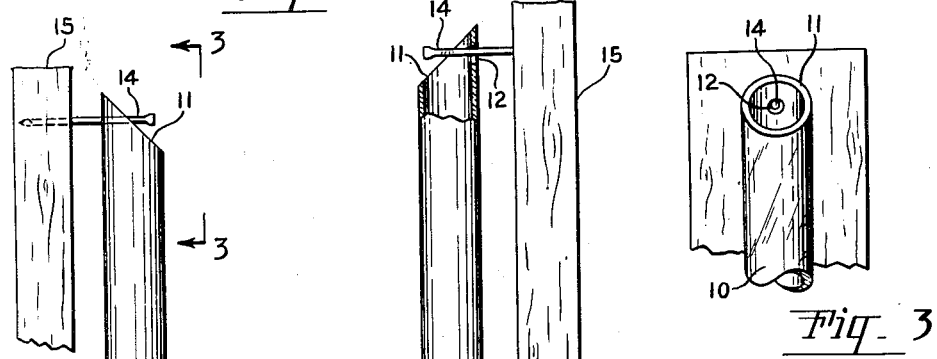
Fig. 3
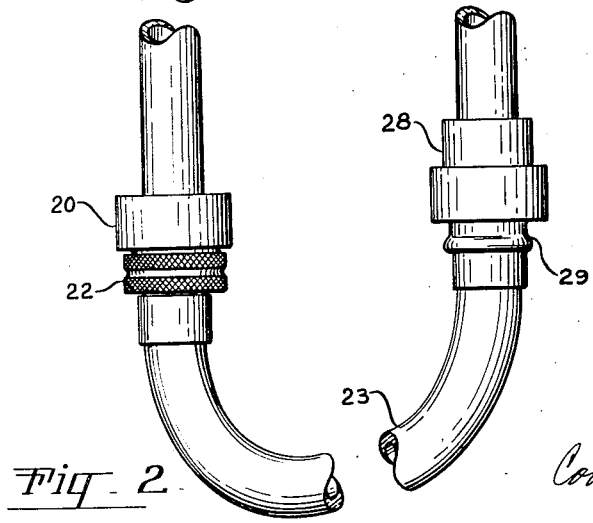
Fig. 2
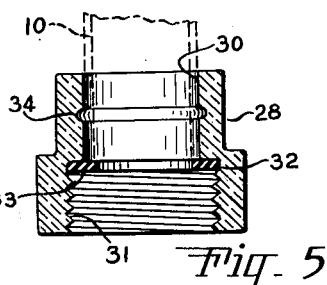
Fig. 4
Fig. 5
INVENTOR.
OTTO T. HOUGE
BY
Cook and Schermerhorn
Attorneys

United States Patent Office 2,789,365
Patented Apr. 23, 1957

2,789,365

LEVELING INSTRUMENT

Otto T. Houge, Waldport, Oreg.

Application February 13, 1956, Serial No. 565,051

2 Claims. (Cl. 33—209)

This invention relates to improvements in leveling instruments and is more particularly concerned with that type of instrument having a pair of fluid receiving indicating devices utilized with an interconnecting hose.

A principal object of the present invention is to provide an improved leveling instrument having simple and inexpensive structure and being adapted to establish accurately and expeditiously a horizontal level between spaced points, such as in connection with the construction of concrete forms or foundations, landscaping, road construction, and for other purposes.

A further object is to provide a leveling instrument which is readily utilized by one person and which also may be readily utilized by an unskilled person.

A still further object is to provide a leveling instrument having novel coupling means for receiving suitable inter-connecting means, such as a conventional garden hose.

Yet another object of the invention is to provide novel slide means movable to set positions on transparent tubes for establishing reference positions on the tubes in relation to liquid therein.

In general, the invention comprises a pair of elongated, transparent tubes, each having an upper beveled end and an aperture adjacent this end. The beveled end is adapted to be sealed by the operator's thumbs when necessary, and the apertures adjacent the upper ends are for conveniently suspending the tubes on stakes or posts at desired locations. Coupling means are provided on the bottom end of the tubes for connecting thereto male and female hose connections of a conventional garden hose. Adjustably mounted on each of the transparent tubes is a slide member comprising a spring band which grips the tubes in a frictional fit and which can be adjusted to reference positions in relation to liquid levels in the tubes.

The invention will be better understood and additional objects and advantages will become apparent from the following description taken in connection with the accompanying drawings which illustrate a preferred form of the invention. It is to be understood, however, that the invention may take other forms and that all such modifications and variations within the scope of the appended claims, which will occur to persons skilled in the art, are included in the invention.

In the drawings:

Figure 1 is an elevational view showing the two indicating devices spaced at desired reference points and being inter-connected by a garden hose;

Figure 2 is an elevational view of the two indicating devices;

Figure 3 is a fragmentary elevational view taken on the line 3—3 of Figure 2;

Figure 4 is a longitudinal sectional view of coupling means at the lower end of one of the indicating devices for receiving a female connection of a garden hose; and Figure 5 is a longitudinal sectional view of coupling means on the other indicating device for receiving the male connection of a garden hose.

Referring particularly to the drawings, each of the two indicating devices which form a part of the present instrument comprises an elongated tube 10, preferably formed from an inexpensive, unbreakable transparent material such as clear plastic. The upper end of each of these tubes is beveled at 11, and this beveled portion is adapted to be engaged by the operator's thumbs when it is desired to trap the liquid within the instrument, such as when moving it between points of location. Each of the tubes 10 has an aperture 12 adjacent the upper end thereof in the high side of the tube above the low side of the bevel and these apertures are intended to receive supporting elements such as nails 14 on stakes or posts 15 driven into the ground at the reference points. The two tube portions are thereby readily suspended in place and this structure obviates expensive and cumbersome supporting structure or an extra operator for holding the parts at a desired location and at a desired height.

Carried on the tubes 10 are band members 17 formed from a spring material, such as spring wire or plastic. These band members frictionally grip the tubes 10 so as to be capable of remaining in set positions to establish reference points relative to the water level in the tubes. The band members 17 are readily slidable to their reference points, and, as shown herein, these members may comprise simply an expandable split ring, such as a plastic turkey leg band.

One of the tubes 10 has mounted on its bottom end a coupling member 20 having a bottom threaded male portion 21 for receiving the female connecting portion 22 of a garden hose 23. The coupling 20 has a smooth longitudinal bore 25 adapted to receive the tube 10 in a snug fit. An annular groove 26 is provided in the wall of opening 25, and this groove serves the function of holding a quantity of adhesive adapted to be transferred to the wall of the tubes 10 when the parts are assembled. More specifically, it is a preferred construction to form the tube 10 and coupling 20 as separate parts, and then adhesively secure these members together as shown in Figure 4. However, in slidably fitting these two members together with adhesive applied to the surfaces to be joined, most of the adhesive will be wiped off when the tube 10 is moved into the opening 25. By placing a quantity of adhesive in the groove 26, a portion thereof will be picked up by the wall of tube 10 as the tube moves into the coupling and be distributed between adjoining wall surfaces to provide a better sealed joint which will not leak.

The other tube 10 is provided with a coupling 28 adapted to receive the male connection 29 of a garden hose. This coupling has a smooth bore 30 in the upper portion thereof and a threaded counterbore 31 in the lower end. The inner end of counterbore 31 forms a shoulder 32 for a suitable rubber sealing washer 33 which prevents leakage of water back through the threaded counterbore. This coupling, similar to the coupling 20, has a groove 34 in the wall of bore 30, and this groove serves the same purpose as was described in connection with groove 26 in the coupling 20.

The tube 10 is adhesively secured in the bore 30 to provide an integral structure, and, preferably, the bottom edge of the tube 10 is in the plane of shoulder 32 whereby, as seen in Figure 5, this bottom edge, together with the shoulder 32, forms a sealing abutting surface for the washer.

To use the instrument the two indicating devices are connected to the opposite ends of a conventional garden hose and sufficient water introduced thereto so as to stand in the tubes 10. The resilient band members 17 are then moved to a height corresponding to the water level in the tubes. When the water has been introduced in the instrument and it is desired to move the instrument to a different location, the top openings at the beveled end 11 are readily sealed by the operator's thumbs and the apertures 12 are readily sealed by the forefingers.

When setting up the instrument for establishing a level between spaced points a first one of the devices is supported vertically on a nail 14 and suitable peg 15, and the other device is then supported in its distant location with the water level at the band 17. The means for supporting the two tubes 10 facilitates easy use of the instrument, and also facilitates the use thereof by one person, in that the first tube can be supported in elevated position on a peg, and while thus supported, the other tube can be moved to a desired location and supported on a suitable stake at a height to move the water into viewing position. The present structure is inexpensive to manufacture and, in addition, it obviates the necessity of expensive and cumbersome base structures for supporting the indicating devices in elevated position. When not in use it may be disconnected from the garden hose and thereby requires only a small space for storage.

Having now described my invention and in what manner the same may be used, what I claim as new and desire to protect by Letters Patent is:

1. A leveling instrument comprising a pair of transparent tubes, each of said tubes having a beveled open upper end arranged to be engaged by the operator's thumbs for sealing liquid in the instrument when desired, aperture means in the high side of said tubes above the low side of the bevel for suspending said tubes, coupling means on the lower ends of said tubes for connection to opposite ends of a conventional garden hose, and spring band means mounted in a sliding frictional fit on said tubes.

2. A leveling instrument comprising a pair of transparent tubes, each of said tubes having a beveled upper end and an aperture adjacent said upper end for suspending said tubes, one of said tubes having a male coupling thereon for receiving a female connection of a conventional garden hose, the other of said tubes having a female coupling thereon for receiving a male connection of said garden hose, said tube couplings having an internal bore to receive said tubes and being arranged to be adhesively secured thereto, said tube couplings having a groove in the wall of said bore for containing a quantity of adhesive for transfer to wall surfaces of said tubes in the assembly of the instrument.

References Cited in the file of this patent

UNITED STATES PATENTS

| | | |
|---|---|---|
| 1,599,347 | Purkey | Sept. 7, 1926 |
| 1,605,698 | Bliss | Nov. 2, 1926 |
| 2,566,102 | Waldo | Aug. 28, 1951 |